March 12, 1957 K. EHRAT 2,785,224

ENCIPHERING DEVICE

Filed Aug. 17, 1953 4 Sheets-Sheet 1

INVENTOR:-

Kurt Ehrat,

BY

Pierce, Scheffler & Parker,

Attorneys.

March 12, 1957 K. EHRAT 2,785,224

ENCIPHERING DEVICE

Filed Aug. 17, 1953 4 Sheets-Sheet 2

INVENTOR:-
Kurt Ehrat,
BY
Pierce, Scheffler + Parker,
Attorneys.

March 12, 1957 K. EHRAT 2,785,224

ENCIPHERING DEVICE

Filed Aug. 17, 1953 4 Sheets-Sheet 3

INVENTOR:-
Kurt Ehrat,
BY
Pierce, Scheffler + Parker,
Attorneys.

ENCIPHERING DEVICE

INVENTOR:-
Kurt Ehrat,
BY
Pierce, Scheffler & Parker,
Attorneys.

2,785,224

ENCIPHERING DEVICE

Kurt Ehrat, Zurich, Switzerland, assignor to Edgar Gretener, Zurich, Switzerland Application August 17, 1953, Serial No. 374,469

Claims priority, application Switzerland August 19, 1952

9 Claims. (Cl. 178—22)

The present invention relates to an apparatus for forming the key of enciphering devices, particularly of enciphering devices for telegraphy.

For secret transmission of messages a "key" is customarily employed, which serves to transform the clear text of the message into a text illegible for unauthorized persons. This key must be known to the sender as well as to the receiver of the message. In enciphering devices, the transformation from clear text into enciphered text is effected mechanically and the devices employed by sender and receiver must ensure an identical law of transformation and retransformation, i. e. they must use identical "keys."

For enciphering telegraph messages, by ways of example, devices are provided at transmitter which effect transformation of the current step combinations of clear text to be transmitted and which reconstitute them at the receiver by a reverse process. For his purpose a train of current step combinations is generated which has the same number of current steps per combination as the clear text combinations, the sequence thereof, however, being as irregular as possible. The individual current steps of the clear text combinations and of the enciphering combinations are combined according to the well-known "Vernam rule." This rule provides that a positive step is produced, if current steps of clear and enciphering combinations have the same sign, i. e. are both positive or negative, whereas a negative current step is produced if they have opposite signs. The enciphered combinations thus formed are transmitted to the receiver where they are again combined with the same train of enciphering combinations. Thus the current step combinations of the clear text are reconstituted. The train of enciphering combinations generated by the device at the transmitter and at the receiver represent the "key" of a system.

The degree of secrecy obtained by such devices is the higher, the more "irregular" the key, i. e. the less the law is apparent according to which transformation from clear text into enciphered text is effected. In the ideal case the current step combinations of the key have random distribution, i. e. their succession depends solely upon chance. The key has an infinite length, i. e. it does not repeat. In contradistinction thereto the key produced by practical devices has fundamentally a limited finite length. Irregularity and length thereof, which are still further reduced by economical reasons, must, however, sufficiently screen the law of key formation and a minimum length of the key without repetition must be attained. A further requirement with such devices is that it must be easily possible to chose new and different keys, in such a manner that a minimum alteration of the device entails a maximum variation of the key.

A great variety of suggestions has been made for the above mentioned purpose. The train of enciphering combinations by ways of example may be recorded on a punched tape which must have a certain minimum length.

For the same purpose devices have become known which provide a number of cam wheels which actuate contacts, the train of enciphering combinations being derived from the position thereof. The rotation of the cam wheels is generally effected in steps by suitable gears. Special measures are necessary in order to obtain a maximum length of the key period. By ways of example cam wheels with different circular pitch are employed which preferably correspond to prime numbers, or which have at least as few common divisors as possible. These requirements, however, entail complications of construction and considerably increase the cost of such devices.

The present invention has the object to avoid these disadvantages and is related to an arrangement for forming the key of enciphering devices by continuous permutation of the mutual position of a number of stepwise rotatable elements the positions of which determine the key. This device is characterized by the feature that all elements have the same circular pitch and that for the purpose of guaranteeing a minimum length of permutation at least one part of these elements is combined to form an ordered group in cascade arrangement, within which the stepwise rotation of a higher element is controlled in dependence upon the position of all lower elements.

The present invention will be explained in the following with the aid of the attached drawings, wherein Fig. 1 as embodiment shows an apparatus for generating a train of current step combinations for enciphering telegraph signals partly in perspective, partly in schematic representation.

Figure 1:
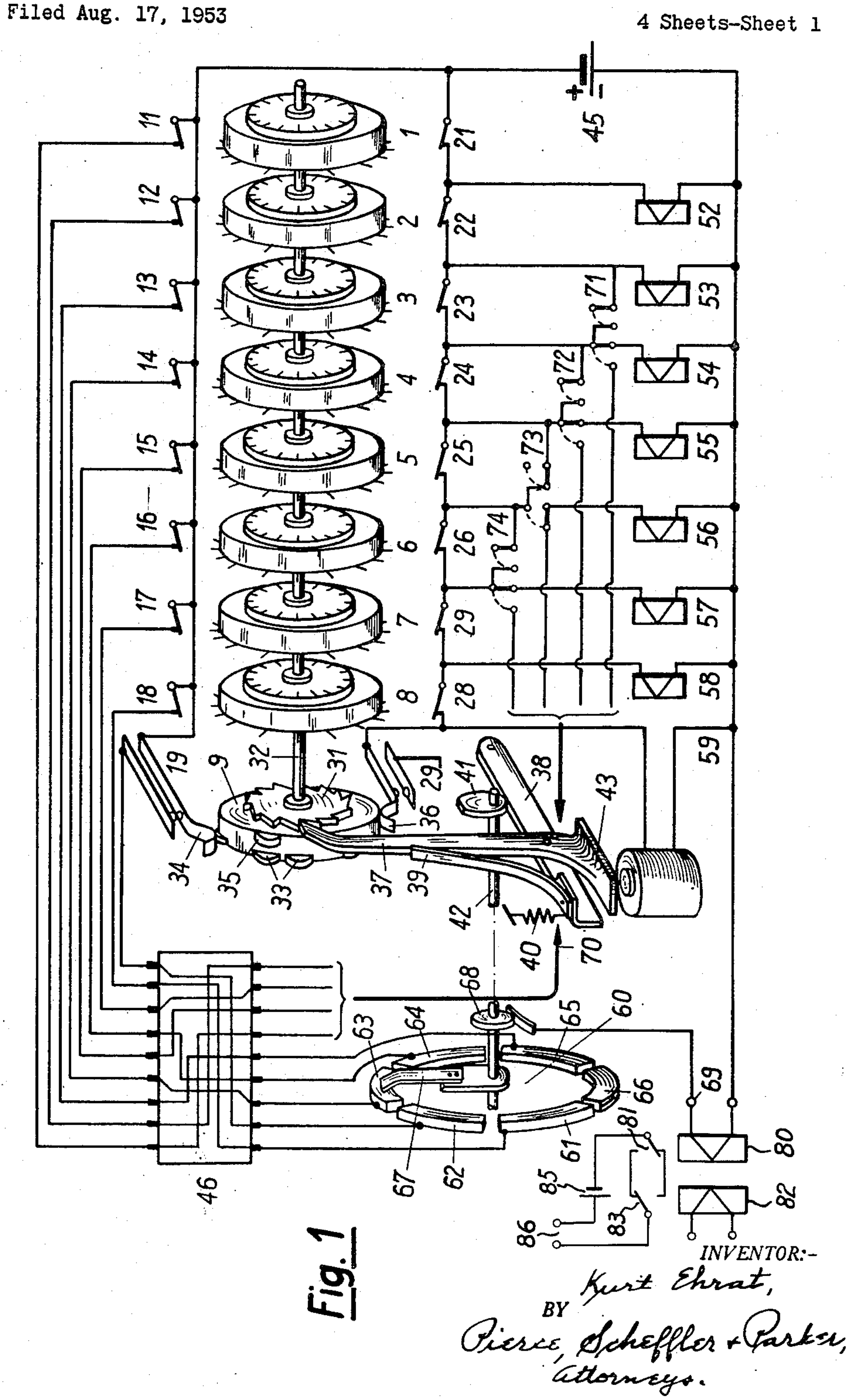

Fig. 1 shows in schematic representation an apparatus for generating a train of enciphering combinations employing the principle of the present invention. According to representation the device comprises nine cam wheels, each wheel operating two contacts, and the mechanism for rotating these wheels. Cam wheel 9 with its appertaining contacts is shown in perspective representation. The other cam wheels 1—8 which are identical to wheel 9, have been represented only schematically for the sake of clarity. Cam wheel 9 is fixedly connected to a rachet wheel 31 which is rotatably journalled on a shaft 32. Wheel 9 provides a number of cams 33. Due to the stepwise rotation of the wheels, the cams pass under spring 34 and thus actuate contact 19. The number of cams and their distribution along the circumference of the wheel is different for each one of cam wheels 1—9. As schematically indicated all cam and rachet wheels, however, have the same circular pitch or division, i. e. the rachet wheels have the same number of teeth. Consequently each wheel executes the same number of steps per revolution. Likewise the cam wheels have the same number of possible positions of cams. Sideways of cams 33 an additional cam 35 is located on the circumference of the cam wheel, which actuates spring 36 of a second related contact 29. Spring 36 is located in such a manner that it cannot be actuated by cams 33, so that contact 29 is actuated only once for each revolution of wheel 9. The other wheels likewise provide an additional cam, actuating once during a full revolution of the wheel the appertaining contacts 21—28, respectively. Cams 33 together with contact 19 and correspondingly contacts 11 and 18 of the other wheels serve for forming the current step combinations. Cam 35 with contact 29 and contacts 21—28 correspondingly serve to control the stepwise rotation of those wheels which form an ordered group according to the present invention. The stepwise rotation of the individual cam wheels is effected by a transport mechanism which is provided in identical form for each wheel. A rachet lever 37 meshes with rachet wheel 31. This rachet lever is journalled on lever 38 and is urged against the teeth of wheel 31 by a leaf spring 39. By a spring 40 lever 38 is urged against a cam 41 which is located on shaft 42. Shaft 42 is rotated with constant speed by a source of power not shown in the drawings. Thereby lever 38 is periodically urged downwards so that rachet lever 37 transports wheel 9 through the intermediary of rachet wheel 31, i. e. by one step for each revolution of cam 42. An armature plate 43 is connected to rachet 37 and is located in front of a magnet 59. Magnet 59, if excited, will hold the armature plate 42 for the short interval during which the lever is urged downward. It thus prevents the rachet from meshing with the next tooth of rachet wheel when the lever starts its upward movement. Thereby transport of a cam wheel is interrupted for this step. According to representation cam 41 is mounted on the same shaft as the brush 67 of a rotating distributor 60 (described below). The form of the flanks of the cam is determined in such a manner that the movement of the lever and thus the stepwise motion of cam wheels is only effected during the interval within which the brush passes over the so-called "rest segment" 66 of the distributor.

According to the invention the rotation of cam wheels forming an ordered group is effected by suitable mutual electrical connections between the magnets 52—59 and the cam contacts 21—29. Contacts 21—29 represent make-contacts and are connected in series to the positive terminal of current source 45. The magnets 52—59 are connected to the contact circuit in such a manner that the magnet of a higher wheel, respectively, is connected to the current source 45 through the contacts of all preceding lower wheels.

Due to this circuit connection stepwise rotation of each higher wheel within the ordered group is controlled in dependence upon the position of all lower cam wheels. By ways of example magnet 52 of wheel 2 is connected to the current source through contact 21 of wheel 1, magnet 53 of wheel 3 through contacts 22 and 21 of wheels 2 and 1 and so on. Wheel 2 is thus stopped when contact 21 is closed. Wheel 3 is only arrested if contacts 21 and 22 are closed at the same time. Wheel 9 is only arrested if contacts 21—28 are all closed at the same time. No magnet is provided for contacts 21 of wheel 1 which is thus continuously rotated stepwise by the transport mechanism. As contacts 21—28 are each only actuated once for one complete revolution, stepwise rotation by ways of example of wheel 2 is interrupted only once for one step during one complete revolution of wheel 1. Transport of wheel 3 is only interrupted for one step if contacts 21 and 22 are actuated at the same time. This, however, will only occur after wheels 1 and 2 have run through all possible combinations of mutual position, i. e. after a number of transport steps equal to the product of the circular pitch of both wheels.

Due to this circuit, the same combination of positions of all wheels within the ordered group occurs for the second time only after all other possible combinations of position have been run through, i. e. after a number of steps equal to the product of the circular pitch of all wheels forming this group. In contradistinction to a counter mechanism, e. g. as it is known, from calculating machines, the rotation of wheels is interrupted as little as possible, i. e. only by one single step after definite intervals, after all lower wheels of the group have passed through all possible combinations of position. The practically uninterrupted rotation of all wheels considerably increases the "irregularity" of the key derived from the position of all wheels as will be explained below. In contradistinction thereto the higher wheels of a counter stand still for most of the time and are rotated by one step only when the lower wheels have passed through all possible combinations of position.

The formation of current step combinations is effected from contacts 11—19 by means of a rotating distributor 60. The distributor has segments equal in number to the number of current steps of the pulse code employed for transmission. If by ways of example, as shown in the drawing, a 5-unit code is employed the distributor has five segments 61, 62, 63, 64 and 65 and a rest segment 66. Segments are connected to the positive terminal of the current source 45 through the cam wheel contacts and are successively scanned by a brush 67. Brush 67 is connected to the output terminal 69 where the current step combinations may be obtained. In order to use these current step combinations for the desired purpose of enciphering they are, by way of example, fed to a relay 80, which operates a double throw contact 81. A second relay 82 is fed by the current step combinations to be enciphered, which operates a second double-throw contact 83. The contacts are connected in the manner shown in Fig. 1 in series with a battery 85 to the output terminals 86. It is easily understood that the current step combinations appearing at terminals 86 correspond to a sequence of the clear text current combinations delivered to relay 82 enciphered according to the already mentioned "Vernam rule" by the current steps combination generated in the device according to Fig. 1. Thus if e. g. contacts 81 and 83 are moved downward if current flows through the appertaining relays, and move upward if no current flows, the case represented in Fig. 1 is that current flows through relay 80 and no current flows through relay 82. Or, in other words, in the moment represented the clear text sequence delivered to relay 82 shows a "—" or "no current" step, the enciphering sequence delivered to relay 80 shows a "+" or "current" step. According to the Vernam rule a "+" step combined with a "—" step should give a "—" or "no current" step. This is seen from the drawing, where no current may flow to the line connected to terminals 86, as the two contacts 81 and 83 are in opposite positions. If both relays lead "+" or "—" steps simultaneously, current will flow through the circuit 85—81—83—86. If contrary-wise the two relays lead deviating current steps, i. e. "+" and "—," or "—" and "+," no current will flow through that circuit, as prescribed by the Vernam rule. This principle of enciphering is well known and has been described in detail in my U. S. Patent No. 2,629,012 issued on February 17, 1953. As already mentioned, brush 67 of the distributor may be mounted on the same shaft as the cam disc, e. g. 41, of the transport mechanism. The shape of the flanks of the cam disc are determined in such a manner that the cam wheels are rotated during the interval during which brush 67 passes over rest segment 66. In case of start-stop operation the distributor is stopped after each revolution of the brush as soon as it reaches the rest segment. Transport of the cam wheels is thus effected either immediately after the starting of the distributor, i. e. immediately before passing over segments 61 to 65, or immediately before stopping thereof, i. e. after passing over the segments. In this manner the rotation of the wheels is effected only once per each revolution of the distributor and only by one step at the utmost. Contacts 11—19 are thereby actuated in dependence upon the accidental position of wheels and of the cam on said wheels.

As the contacts 11 to 18 shown in Fig. 1 are single pole switches, the current steps produced at terminals 69 are of the single-current type, i. e. either "+" and "0" or "—" and "0." If, however, double-current type signals are desired, i. e. "+" and "—," the single-pole switches have to be replaced by double-pole switches in the manner well known in the art.

It is of course to be understood that in order to effect enciphering in the manner just described it is necessary that the distributor brush 67 rotates with the same speed as the distributor commonly used in the teletypewriter delivering the clear text signs to relay 82. This, however, may be attained by means well known in the art, which consequently need not be described.

It is easily understood that the apparatus just described may serve to decipher the signals so enciphered in the same manner. It is only necessary to connect the incoming enciphered signals to relay 82 and to connect the teletypewriter used for recording the deciphered clear text to terminals 86. The array of relays 80 and 82 will now reverse the enciphering according to the Vernam rule and produce the clear text current step combinations. For this purpose it is of course necessary that the two devices producing enciphering current step combinations as transmitter and receiver produce identical sequences of combinations, which may be obtained by using identical cam wheels and other elements in the two devices and having them rotated synchronously.

In order to increase the irregularity of the apparatus advantageously the number of contacts is chosen larger than the unit number of the employed impulse code, and a permutator switch 46 is inserted in between contacts and distributor. Within this switch the connections between input and output terminals are continuously permuted, by ways of example, by a rotating commutator with a corresponding number of segments upon which the same number of brushes slide. The switch may by way of example be rotated by the transport mechanism of the cam wheels. Part of the output terminals of the commutator switch is connected to the segments of distributor 60. The remaining output terminals of the permutator switch may be employed for rotating those cam wheels which do not form part of the group. This is indicated by arrow 70. The rotation of these wheels now depends upon the position of only one single other wheel—though this is continuously exchanged by the permutator switch. Instead of connecting contacts 11—19 to the current source in parallel as shown in the drawing, a so-called cascade of commutator switches may be employed as that has been described in U. S. Patent No. 2,629,012, issued on February 17, 1953, whereby the irregularity of the key may be considerably increased.

Furthermore as has been shown in the drawing, a number of manually operated commutator switches 71, 72, 73 and 74 may be provided which permit to have the actuation of magnets, e. g. of magnets 54, 55, 56 and 57 effected alternatively as a group or through permutator switch 56 by cam contacts 11—19. If by way of example switch 73 has the shown position magnet 56 is connected to permutator switch 46. Transport of wheel 6 thus depends only upon the position of one single cam contact as explained above. The appertaining contact 25 is short-circuited and the group now only comprises 1, 2, 3, 4, 5, 7. By actuating the other switches 71, 72 and 74 the combination of cam wheels forming the group may be altered at will.

An arrangement according to the present invention offers the advantage of comparatively cheap construction due to the employment of cam wheels and rachet wheels with identical circular pitch. Formation of a group from a part of the cam wheels guarantees a minimum length of the period after which the train of enciphering combinations repeats for the first time. Rotation of a part of the wheels, i. e. of the part not appertaining to the group, in dependence upon the position of only one single other wheel, i. e. by connecting the magnets to the output terminals of the permutator switch as shown, increases the irregularity of the key and has furthermore the advantage that the train of enciphering combination, i. e. the "key" of the device, is varied to a considerable extent by slight alterations, by way of example by displacing only one wheel. Such considerable variation of the key effected by simple means simplifies operation of the device and increases the security against unauthorized deciphering.

In contradistinction thereto in the devices hitherto known, the wheels had to have different circular pitch, preferably without a common divisor. If in such devices cam wheels of identical pitch were employed and would be rotated in the known manner in dependence upon the position of only one other wheel, this would incur the risk of a considerably reduced minimum period due to accidental disadvantageous choice of the position of cams on the different wheels, etc. whereby unauthorized deciphering of the message would be simplified and secrecy endangered.

Figure 2:
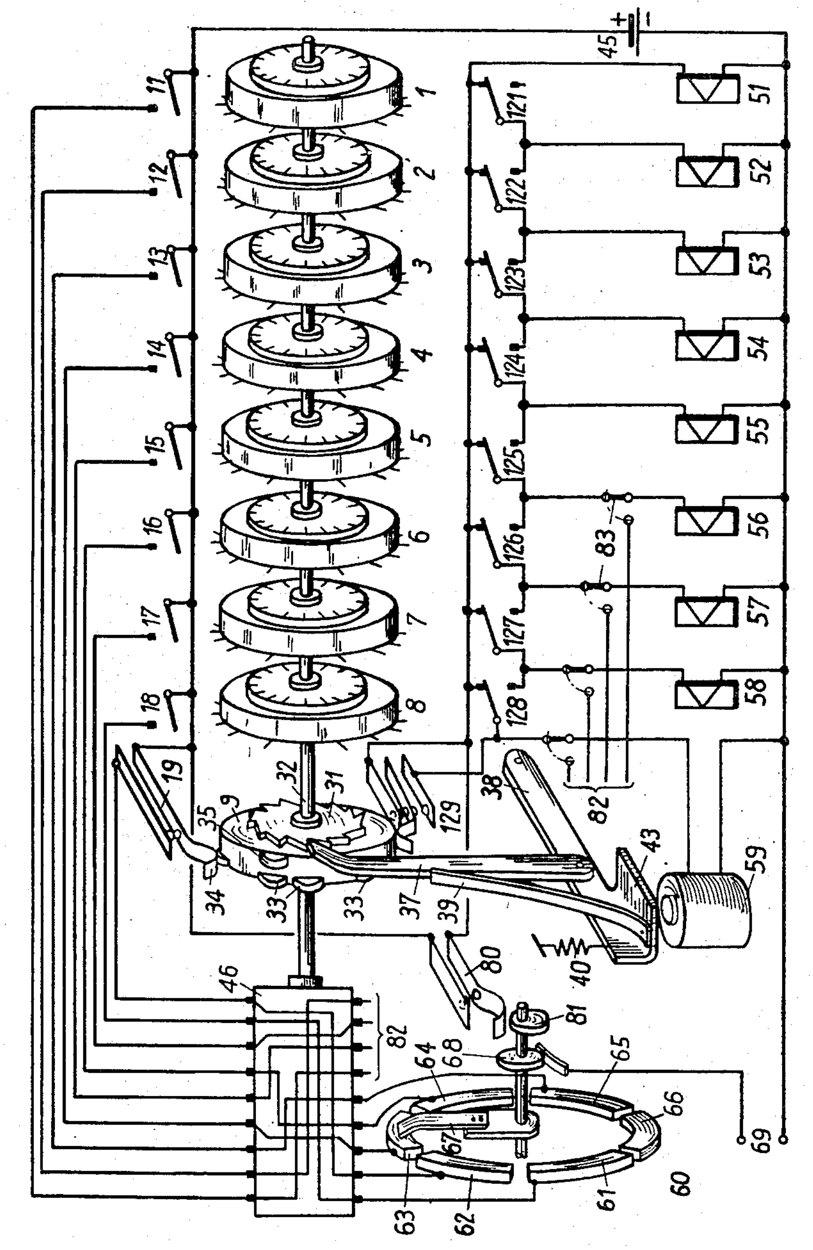
Figs. 2 and 3 show modifications of the embodiment of Fig. 1.

Fig. 2 shows in schematic representation another embodiment of an apparatus which employs the principle of the present invention. This device differs from the device of Fig. 1 insofar as the stepwise rotation of the cam wheels is effected by the magnets themselves without mechanical means. The cam wheels and the rachet mechanisms, as well as the arrangement of contacts 11—19 are identical to those of Fig. 1. In contradistinction, however, stepwise rotation of cam wheels is effected by periodic excitation of magnets 51—59. The armature plate 43 is thus periodically attracted and lever 38 urged downward. After interruption of the magnet circuit spring 40 again pulls the lever upward and rotates cam wheel 9 by one step through the intermediary of rachet 37 and rachet wheel 31. The same arrangement is provided for the other wheels 1—8. As rotation is effected by magnets a transport magnet 51 must be provided for wheel 1 in this device. A contact 80 serves to effect the periodic excitation and is actuated once for every revolution by an excentric disc 81 mounted on the shaft of distributor 60. The series circuit of contacts 121—129 is connected to the positive terminal of the current source 45 through this contact 80. Magnet 51 for wheel 1 is directly connected to the current source 45 through contact 80. Consequently wheel 1 is continuously rotated stepwise in the same manner as in the device of Fig. 1. Contacts 121—129 are designed as make-and-break contacts and are actuated by the contact cams of the different wheels, i. e. once per revolution. By way of example contact 129 is actuated by cam 35 of wheel 9. The break-contacts of contacts 121 to 129 are connected in parallel over impulse contact 80 to the current source. The make-contacts are each connected to their respective transport magnet and to the central contact spring of the preceding make-and-break contact of the group. It is seen that thereby a rotation of the wheels is again effected in such a manner that the stepwise rotation of the succeeding higher cam wheel depends upon the position of all lower cam wheels of the group. As has already been mentioned wheel 1 is continuously rotated stepwise by magnet 51. Magnet 52 is connected to the impulse contact 80 if contact 121 is in its rest (make-) position and is thus rotated stepwise. Rotation is only interrupted if contact 121 is opened by the switching cam of wheel 1, consequently only once for each impulse of wheel 1. Rotation of wheel 3 by magnet 53 is only interrupted if both alternating switches 121 and 122 are opened at the same time. If only one of the two contacts is opened magnet 53 is nevertheless excited. If by ways of example contact 121 is opened magnet 53 is directly connected to impulse contact 80 through contact 122 when in rest position. On the other hand if contact 122 is opened magnet 53 is connected to the impulse contact 80 through make-contact 122, center contact and make-contact 121. It is obvious that with this circuit of the make-and-break contacts the respective magnet is not excited and stepwise rotation of the appertaining wheel is interrupted only if all preceding contacts of the group are opened.

In this manner a minimum length of the period is guaranteed also with the device of Fig. 2 by forming an ordered group from part of the wheels. The period length is obtained as the product of the pitches of the cam wheels forming the group. Contacts 11—19 together with the permutator switch 46 and distributor 60 serve to generate the enciphering combinations in the same manner as in the embodiment of Fig. 1. These combinations may be obtained at the output terminals 69 of the device.

Obviously it is not necessary that the group be always formed by the same cam wheels. By ways of example magnet 56—59 may by actuating switch 83 alternatively be connected to the output 82 of the permutator switch. In this case it will be excited by contact 1—19 selected by the permutator switch, and only wheels 1—5 represent a group according to the principle of the invention. Combination of wheels 1—5 to form an ordered group now again serves to guarantee a minimum length of the key period whereas transport of the other wheels through the intermediary of the permutator switch increases the irregularity and above all permits a maximum variation of the key with a minimum alteration of the device.

In the arrangement of Figs. 1 and 2 a particular contact was provided to control the rotation of the cam wheels forming the ordered group, which was actuated by a special switching cam, only one cam being provided on each wheel. In contradistinction thereto in a further embodiment shown by Fig. 3 the contacts serving for the formation of impulse combinations themselves are employed for stepwise transport within the group. The embodiment of Fig. 3 differs from that of Fig. 2 insofar, as two rows of cams are provided on each cam wheel. On cam wheel 9, cams 33 of the one row actuate contact 19, and cams 133 of the second row actuate contact 229. Distribution of cams along the two rows is optional and different for the different cam wheels 1–9. All cam wheels, however, again have the same pitch. In order to guarantee a minimum length of the key period the pitch in this case must preferably be a prime number. The same cam wheels 1–9 thus actuate 18 contacts 11–19 and 221—229. According to representation contacts 11—19 and 225—229 are connected in parallel to the positive terminal of battery 45 and their make contacts are connected to the input of permutator switch 46, a number of the output terminals of the permutator switch 46 is connected to the segments of the rotating distributor 60 so that the impulse combinations may again be obtained at terminal 69. According to representation the remaining terminals 90 of the permutator switch are connected to the transport magnets 56—59 so that the transport of the appertaining wheels 6—9 is effected in dependence upon the position of only one contact—selected at random by permutator switch 46. Contacts 221—224 on the other hand are connected in series to the positive terminal of current source 45 through impulse contact 80. Magnets 51—55 are connected to the series in such a manner that magnet 51 is connected directly, the magnets of all other wheels only through the contacts of all preceding wheels of the group, respectively, to the impulse contact 80. Within the group comprising wheels 1—5 stepwise rotation of the succeeding higher wheel thus depends upon the position of all preceding cam wheels, respectively.

It may be shown that the minimum length of the period is again equal to the product of the pitches of all wheels forming the group if a prime number is chosen for the pitch of cam wheels. Due to this employment of a prime number even in the least advantageous case, e. g. with a group comprising only two wheels, the wheels will return to their common starting position only after the first wheel has executed a number of revolutions, which is equal to the pitch of the wheel. Due to the series connection of contacts, the next higher wheels will only return to their starting position, when the wheels preceding in the group have run through all possible combinations of positions.

As has already been mentioned, in the above shown embodiment the number of interruptions of the stepwise rotation of the individual elements, viz. of the cam wheels, within the entire period becomes a minimum. Rotation of each individual element is only interrupted as often as absolutely necessary to ensure that all possible combinations of position are run through during a full period of permutation. The lowest element of the group is continuously rotated stepwise whereas the rotation of the different higher elements of the group is interrupted for one step only if all lower elements of the group have passed through all possible combinations of position. In the embodiment shown this was obtained by interrupting rotation of the respective higher element within the group for one step only if all lower elements of the group assume a certain position at the same time.

As is known from the theory of combination calculus the number of all possible combinations of position is equal to the product of the number of positions, of all elements. Rotation of the elements as described, i. e. so that interruption of rotation of the individual elements becomes a minimum, has the advantage that a maximum number of elements is rotated at each step. Unauthorized deciphering is thereby considerably complicated as the law of key-formation is so much less apparent, the larger the number of elements cooperating in the formation of the key, which are transported from step to step.

If by ways of example the cam wheels of Fig. 1 have each 26 positions, the number of all possible combinations, which at the same time equals the key period, is equal to $26^5$. During this period the lowest wheel of the group makes $26^5$ steps, the highest wheel ($26^5$—26) steps. This feature fundamentally distinguishes such an arrangement from the rotation employed in customary counters wherein the next higher wheel is only rotated by one step, when the preceding one has executed one entire revolution. In such a counter, the length of the period will again be $26^5$ steps—elements with 26 positions provided. The highest wheel, however, will only execute 26 steps during an entire period.

If the principle of the customary counter was employed for rotation within a key-forming device, the reduced number of steps executed by the different elements is highly disadvantageous to the degree of secrecy. The lower the number of variations effected from step to step, the easier the law of enciphering may be derived from the enciphered text and the enciphered message may thus be deciphered.

Figure 3:
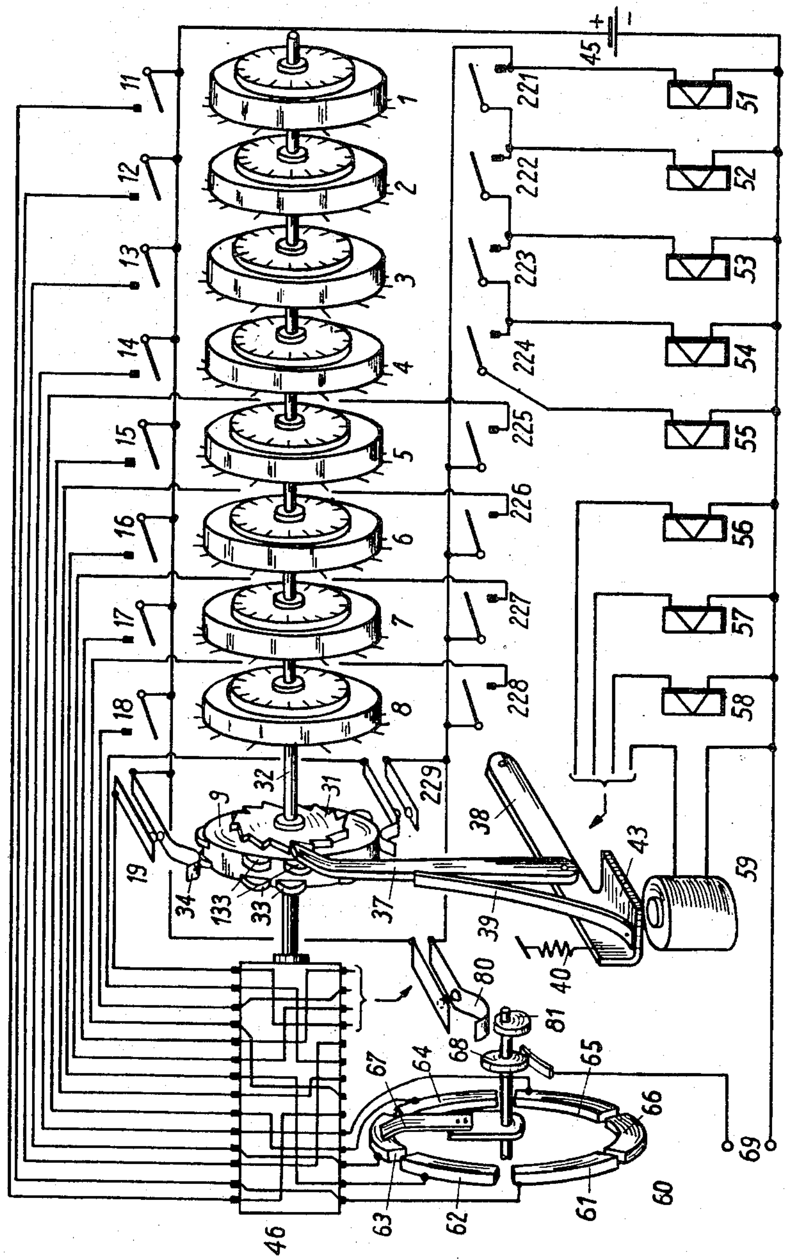

With the arrangement of Fig. 3 the individual elements do not attain the high number of steps as attained by the embodiments of Figs. 1 and 2 as here rotation is more frequently interrupted in dependence upon the number of cams 133 provided on the lower elements of the group. The number of steps executed by the individual elements, however, during one entire period is still considerably higher than of a customary counter. The present invention is now by no ways limited to devices as have been described as embodiments in Figs. 1–3, viz. to devices which serve to generate a train of current step combinations for enciphering telegraph signals. The invention may also be advantageously employed with enciphering machines as have become known in several cases. Such machines have a key board similar to an ordinary typewriter. If clear text is written thereon enciphered text is printed due to a continuous or periodic variation of the interrelation of keys and printing types.

Figures 4, 5:
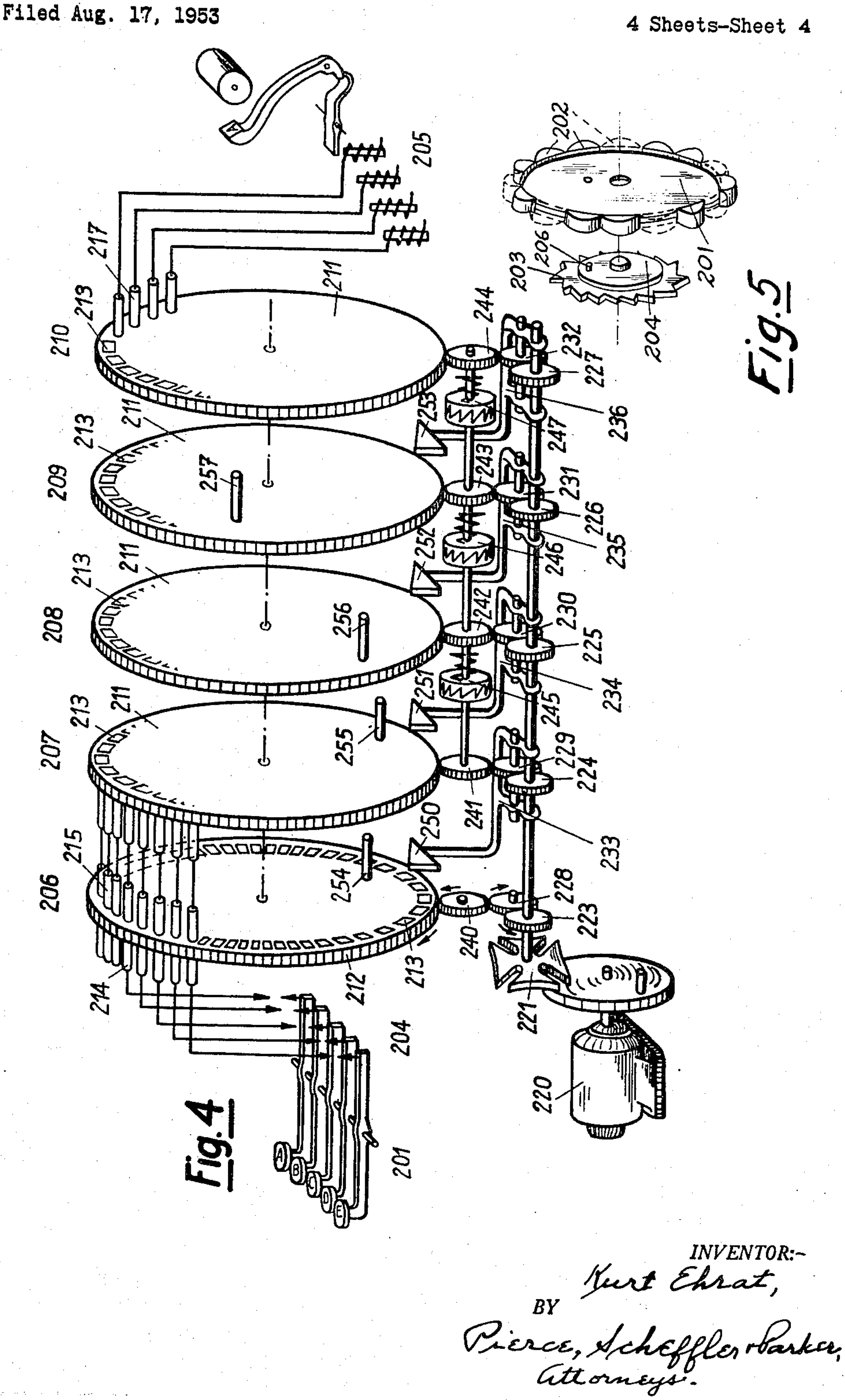
Fig. 4 shows in perspective schematic representation a further embodiment for forming the key of an enciphering machine and Fig. 5 the structure of the cam wheels employed in the devices of Figs. 1, 2 and 3.

This may be effected as has been shown in Fig. 4 in perspective schematic representation, by ways of example by the employment of a number of permutator switches which are inserted in between the key and the types. The "key" is derived from the mutual position of the permutator switches connected in series which varies according to a law as complicated as possible. The position of permutator switches may be varied by employment of the principle of the present invention.

The machine provides a number of keys 201 which resemble a keyboard of a customary typewriter. The individual keys actuate printing types and thus print clear text in the same manner as a typewriter. Each key is furthermore connected to one contact of contact set 204. These contacts are individually connected to magnets 205. Magnets 205 operate a second printing device in such a manner that one printing type of the second device is actuated if the contact 204 connected to the corresponding magnet 205 is closed. Contacts 204 and magnets 205 are connected through five permutator switches connected in series. According to representation each switch 206—210 comprises a disc 211 both sides of which support segments 212 and 213 insulated from each other. The number of segments corresponds to the number of contacts 204 or of magnets 205, respectively. An equal number of brushes 214 and 215 are located opposite to segments 212 and 213, respectively. The segments on both sides of one disc are connected in pairs with utmost irregularity, each of the segments 212 being connected to one of the segments 213. All permutator switches 206—210 are constructed in the same manner and all permutator switches are connected in series, e. g. the brushes sliding on the right surface of switch 206 are connected to the brushes sliding on the left side of switch 207 and so on. The set of brushes 214 is connected to contacts 204, the set of brushes 217 is connected to magnet 205. It is obvious that in dependence upon the position of the five switches 206—210 connected in series any contact of set 204 may be connected accidentally with any magnet of set 205. If a key of board 201 is pressed, a corresponding type is actuated by the magnet which happens to be connected to this key in that respective moment. The "key" of such a device is consequently derived from the mutual position of the five switches. In order to effect continuous permuting one or more of the permutator switches are rotated by one or more segment divisions, i. e. in steps, after certain intervals, by ways of example after each printing action.

In order to ensure a sufficient degree of safety as has been mentioned, permuting of the interrelation between keys and types must be as irregular as possible. If all switches were rotated by one step after each printing action the period would be equal to the division of one disc. In order to guarantee a considerably larger minimum length of the period according to the present invention the discs, or at least part thereof, are combined to form a cascade-group within which the stepwise rotation of the higher switches of the group is controlled by the position of all lower permuting switches of the group.

This is effected with purely mechanical means in the embodiment of Fig. 4. A motor 220 drives the shaft 22 through a Geneva-cross gear 221. Toothed wheels 223—227 are fixedly mounted on the shaft. Wheels 223—227 mesh with toothed wheels 228—232 which are journalled on levers 233—236 rotatable around shafts 22 and thus can be made to mesh with gear wheels 240—244. Toothed wheels 240—244 again mesh with the toothed edge of permutator switches 206—210. Furthermore toothed wheels 241—244 are connected through claw couplings 245—247. If the wheels 241—244 turn counterclockwise (seen from the right) as is indicated by the arrows the claw clutches 245—247 may transmit a torque only from left to right but not in the reverse direction. If discs 206—210 represent a group wherein 206 is the lowest and 210 the highest disc of the group a torque may be transmitted by the claw clutches only from the lower to the higher discs. Levers 233—236 are now connected to links 250—253 which are urged downwards by pins 254—257 connected to the discs. The length of links 250—253 and their position is chosen with respect to the pins 254—257 so that the link is urged downward by the operating pin only during one single step of the disc. If by ways of example and with reference to Fig. 4 of the drawing, pin 256 of disc 208 were in the particular position to move lever 235 appertaining to disc 209 downward, the gear wheel 243 will be moved out of meshing engagement with its driving gear 235. Rotation of disc 209 is not interrupted, however, since gear wheel 243 is rotated through clutches 251 and 252. Each higher disc of the group will be rotated continuously notwithstanding the position of the pins as long as the lower discs are rotated. Thus disc 207 will be stopped for one step once for every rotation for disc 208 if lever 233 is pushed down. Disc 208 will only be stopped if both levers 233 and 234 are pushed down. Rotation of disc 210 thus is only interrupted if none of the wheels do mesh. Or to put it in another way, rotation of a disc of the group is only interrupted if all preceding, i. e. all lower discs of the group assume a certain position. No lever is employed for journalling toothed wheels 228 and 240 serving to drive disc 206, they thus mesh all the time so that disc 206—as the lowest element of the group—it is continuously rotated. The purely mechanical device of Fig. 4 thus acts in exactly the same manner as the embodiments of Figs. 1 and 2.

Fig. 5 shows a cam wheel as that may be employed in the devices of Figs. 1–3 by means of which any desired distribution of cams along the circumference may be obtained. The discs by ways of example consist of plastic and comprise a disc 201 along the circumference of which a number of cams 202 are located. The number of cams corresponds to the number of teeth of the ratchet wheel 203 serving for rotation, i. e. is equal to the "pitch." Cams 202 are mounted on disc 201 with a very thin foot so that they may be broken off in any desired fashion as indicated in the drawing. These cam wheels may now be interchangeably mounted on support 204 which is fixed to the ratchet wheel 203 and are secured against rotation by pin 206. If now the key of the device shall be varied fundamentally the discs may be replaced by others wherein the cams have been broken away in a different manner.

I claim:

1. Apparatus for forming the key in enciphering devices for telegraph sign combinations, said apparatus comprising a cascaded group of stepwise rotatable elements of identical step pitch, cams on said elements at step positions thereof, the location of said cams with respect to the sequence of step positions being different on different rotatable elements, switch members actuated by said cams for forming the telegraph sign combination of the key, and means for advancing said rotatable elements step-by-step to vary the enciphering key, said advancing means for each higher order element of the group including transmission control means rendered inoperative for one step of said higher order element only on the simultaneous location of lower order elements of said group in preselected control positions equal in number to less than one-half their possible step positions.

2. Apparatus as recited in claim 1, wherein lower order elements of said group each have a single control position for rendering inoperative said transmission control means of a higher order element of the group of cascaded elements.

3. Apparatus for forming a train of coded current step combinations for enciphering telegraph sign combinations, said apparatus comprising a plurality of stepwise rotatable elements of identical step pitch, keying cams on said elements at step positions thereof, the location of said keying cams with respect to the sequence of step positions being different on different rotatable elements, a coding network including switches positioned for actuation by the cams of said rotatable elements, stepping means periodically energized for the step-by-step advance of said elements to vary the key, and means cascading a number of said elements in a group for control of the step advance thereof, said cascading means rendering inoperative the stepping means of higher order elements of the group for one step only on the simultaneous location of the lower order elements of the group in preselected control positions equal in number to less than one-half their possible step positions.

4. Apparatus as recited in claim 3, wherein the stepping means of each rotatable member includes a solenoid, and said cascading means comprises a control network for energizing said solenoids, said control network including a normally closed switch associated with each lower order element and operable thereby to open position on arrival of the individual lower order elements in their preselected control positions.

5. Apparatus as recited in claim 3, wherein said stepping means for each rotatable element comprises a ratchet wheel fixed thereto, a pawl cooperating with said ratchet wheel, and a solenoid for actuating said pawl.

6. Apparatus as recited in claim 5, wherein each lower order rotatable element of said group carries a control cam for opening its associated normally closed switch of said control network.

7. Apparatus as recited in claim 5, wherein said coding network includes a rotary switch having active segmental contacts equal in number to the current steps of a code combination and a rotary brush constituting one output terminal of the network, a permutation switch having input contacts connected to the switches actuated by said keying cams and output contacts in a greater number than the active contacts of said rotary switch, leads connecting said active contacts to output contacts of said permutation switch, and wherein said control network includes switch means for selectively connecting solenoids of said stepping means to output contacts of said permutation switch not connected to active contacts of said rotary switch.

8. Apparatus as recited in claim 7, wherein said rotary switch has an inactive segmental contact swept over by the rotary brush during intervals between the formation of successive current step combinations, and said stepping means includes means operative during said intervals to energize the same.

9. Apparatus as recited in claim 3, wherein said rotatable elements each comprises a disk of plastic material, a circumferential row of cams at the periphery of said disk and united therewith by integral frangible feet, whereby selected cams may be separated from said disk.

References Cited in the file of this patent

UNITED STATES PATENTS

| | | |
|---|---|---|
| 1,912,983 | Jipp et al. | June 6, 1933 |
| 2,402,182 | Rosen | June 18, 1946 |
| 2,458,406 | Nichols | Jan. 4, 1949 |
| 2,522,461 | Potts | Sept. 12, 1950 |

FOREIGN PATENTS

| | | |
|---|---|---|
| 885,563 | Germany | Aug. 6, 1953 |